United States Patent [19]

Key

[11] 4,037,349

[45] * July 26, 1977

[54] MINNOW BUCKET WITH WATER AERATING MEANS

[76] Inventor: James A. Key, 812 Hanover, Weatherford, Tex. 76086

[*] Notice: The portion of the term of this patent subsequent to Aug. 3, 1993, has been disclaimed.

[21] Appl. No.: 693,118

[22] Filed: June 4, 1976

Related U.S. Application Data

[63] Continuation-in-part of Ser. No. 547,748, Feb. 6, 1975, Pat. No. 3,972,145.

[51] Int. Cl.² .............................................. A01K 97/04
[52] U.S. Cl. ......................................................... 43/57
[58] Field of Search ............................................. 43/57

[56] References Cited

U.S. PATENT DOCUMENTS

| 2,550,533 | 4/1951 | Clark | 43/57 |
| 2,664,241 | 12/1953 | Sunday | 43/57 |
| 3,972,145 | 8/1976 | Key | 43/57 |

Primary Examiner—Warner H. Camp
Attorney, Agent, or Firm—Clarence A. O'Brien; Harvey B. Jacobson

[57] ABSTRACT

An upstanding generally cylindrical body is provided and includes upper and lower vertically spaced closure walls extending and sealingly secured across the lower end portion of the body. An upwardly opening water receptacle is defined above the upper closure wall and a closed airtight chamber is defined within the body between the upper and lower closure walls. An inverted U-shaped tube has one end thereof secured downwardly through the upper closure wall and the other end has a reverse bend formed therein and includes an upwardly directed terminal end having a tubular valve body supported therefrom. A valve element is shiftably supported from the valve body for movement between open and closed positions and a support member is threadedly engaged with the upper end of the valve body and includes an abutment portion selectively engageable with the valve element to variably displace the latter away from a closed position toward an open position for controlling the venting of air from the airtight chamber through the inverted U-shaped tube and outwardly through the tubular valve body for bubbling upwardly through the water contained within the receptacle defined above the upper closure wall. In addition, structure is provided for introducing air under pressure into the airtight chamber defined between the upper and lower closure walls.

6 Claims, 3 Drawing Figures

U.S. Patent July 26, 1977 4,037,349
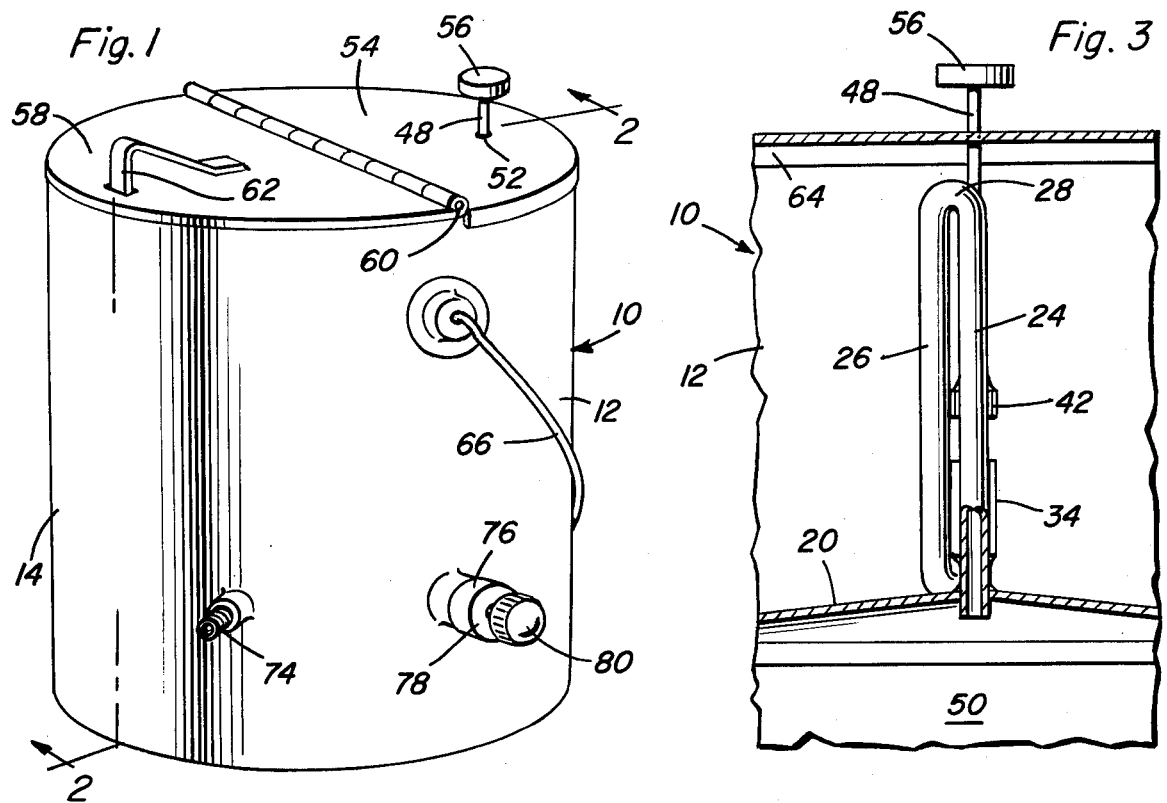
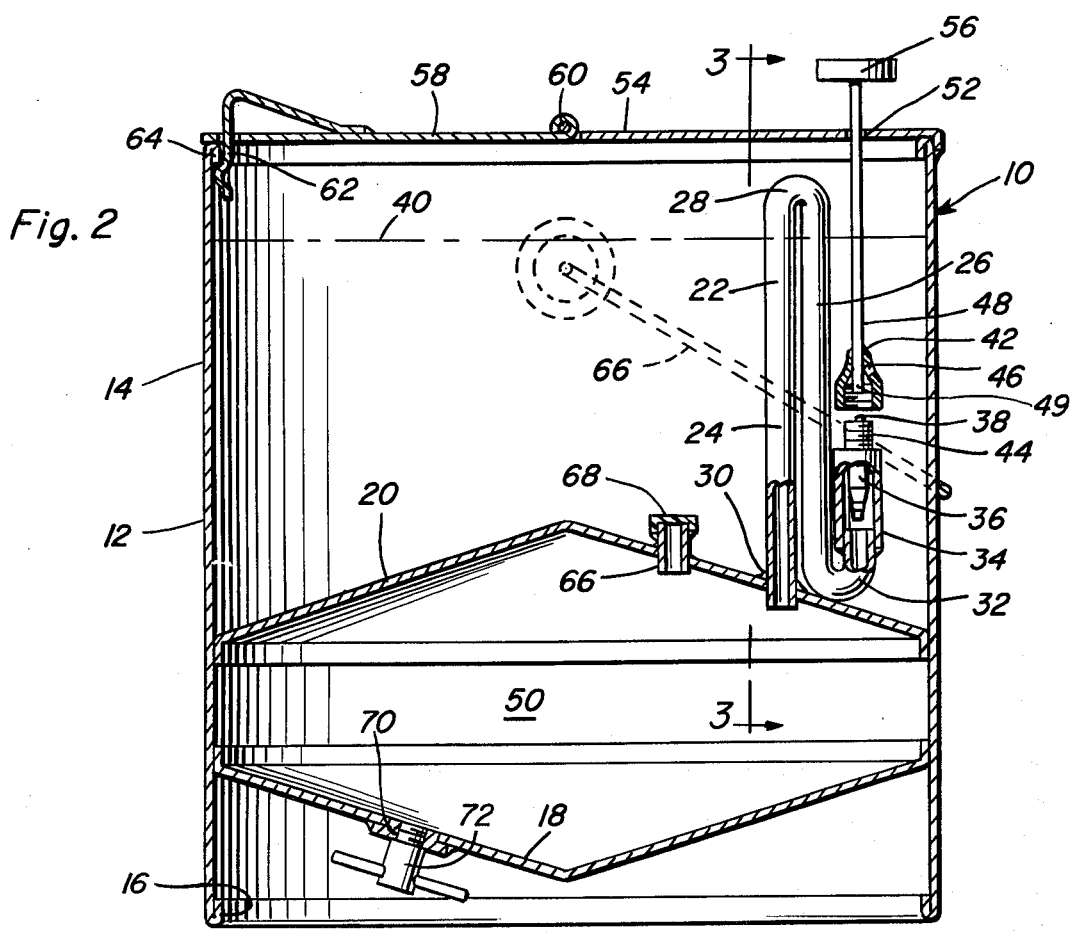

MINNOW BUCKET WITH WATER AERATING MEANS

This application comprises a continuation-in-part of my copending U.S. application Ser. No. 547,748, filed Feb. 6, 1975, now U.S. Pat. No. 3,972,145.

BACKGROUND OF THE INVENTION

Various forms of minnow buckets and the like have been hertofore provided with means capable of aerating the water within the minnow bucket. However, some of these previous water aerating minnow buckets have included hand pumps which must be operated manually or by means of a driving motor substantially continuously during the period that air under pressure is discharged into a lower portion of the minnow bucket. Further, some forms of aerating minnow buckets include hand pumps which are disposed substantially entirely exteriorly of the minnnow bucket and which are therefore subject to damage by impact with adjacent objects. Also, other forms of aerating minnow buckets include complicated and expensive airflow control valves for controlling the flow of air from a compressed air chamber into the bottom of the minnow bucket. Still further, some forms of aerating minnow buckets are constructed in a manner whereby water from within the minnow bucket may flow in a reverse direction through the air passage extending from a compressed air chamber into the bottom portion of the interior of the minnow bucket whereby when the air pressure within the air chamber is greatly reduced to a level only slightly above atmospheric pressure water from within the bucket will flow in a reverse direction into the compressed air chamber.

Examples of aerating minnow buckets of the type above described are disclosed in U.S. Pat. Nos. 299,765, 1,604,971, 1,731,921, 2,550,533, 2,736,983, 2,782,552 and 3,217,444.

BRIEF DESCRIPTION OF THE INVENTION

The minnow bucket of the instant invention includes a pair of vertically spaced bottom walls between which an airtight pressure chamber is defined and selectively usable means in the form of a check valve equipped air inlet and a hand-operable hand pump having an outlet opening into the air chamber are provided on the bucket whereby air under pressure may be introduced into the air chamber. Further, a tubular valve body communicates the interior of the air chamber with the interior of the bucket disposed immediately above the air chamber and the valve body is equipped with a longitudinally reciprocable valve element shiftable between open and closed positions. A suport member is threaddedly engaged with the end of the valve body opening into the interior of the bucket above the air chamber and includes an abutment selectively engageable with the valve element to variably displace the latter away from a closed position toward an open position and to thereby control the venting of air from the air chamber into the interior of the minnow bucket disposed thereabove. Further, the upper end of the minnow bucket includes a stationary partial top wall through which an upstanding operating rod is rotatably received and the lower end of the operating rod is attached to the support member threadedly engaged with the tubular valve body, whereby threaded adjustment of the support member, and thus the abutment carried thereby, may be effected from above the stationary top wall of the minnow bucket. Also, the tubular valve body is supported from a reversely bent upwardly opening terminal end portion of one leg of an inverted U-shaped tube member having the lower end of the other leg thereof secured downwardly through the bottom of the minnow bucket and opens into the air chamber defined therebelow. The U-shaped tube prevents the back flow of water from the interior of the bucket into the air chamber when the pressure of air within the chamber is reduced to a point only slightly above atmospheric pressure.

The main object of this invention is to provide a minnow bucket which will be capable of storing a reasonably large quantity of air under pressure within the air storage chamber and to also provide means whereby air under pressure within the air storage chamber may be variably vented therefrom into the interior of the bottom of the minnow bucket.

Another object of this invention, in accordance with the immediately preceding object, is to provide a minnow bucket having selectively operable means for introducing air under pressure into the airtight pressure chamber.

Another important object of this invention is to provide a minnow bucket including a readily operable infinitely variable control for selectively varying the rate at which air under pressure may be vented from the air pressure chamber into the bottom of the bucket.

Yet another important object of this invention is to provide a means of insuring against the flow of water from the bottom of the interior of the minnow bucket into the air chamber below the bottom of the interior of the bucket when the air pressure within the air chamber is reduced to a level only slightly above atmospheric pressure.

A final object of this invention to be specifically enumerated herein is to provide a minnow bucket in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

FIG. 1 is a perspective view of a preferred form of minnow bucket constructed in accordance with the present invention;

FIG. 2 is an enlarged fragmentary vertical sectional view taken substantially upon the plane indicated by the section line 2—2 of FIG. 1; and FIG. 3 is a fragmentary vertical sectional view taken substantially upon the plane indicated by the section line 3—3 of FIG. 2.

DETAILED DESCRIPTION OF THE INVENTION

Referring now more specifically to the drawings, the numeral 10 generally designates the minnow bucket of the instant invention. The bucket 10 includes a substantially cylindrical body 12 including peripherally continuous upstanding side wall portions 14. The lower marginal portions of the side wall portions 14 include an inwardly directed upturned reinforcing bead 16 and a first lower bottom wall 18 is sealingly secured across the lower end of the body 12 at a point spaced above the lower marginal edges of the side wall portions 14. The bottom wall 18 is generally conical in configuration and open upwardly.

The bucket 10 also includes an upper downwardly opening conical bottom wall 20 spaced above the bottom wall 18 and which is also sealingly secured across the interior of the body 12.

An inverted U-shaped anti-siphon standpipe 22 including a pair of generally parallel upstanding legs 24 and 26 interconnected at their upper ends by means of a reversely bent integral portion 28 is provided and the lower end of the leg 24 is secured downwardly through the upper bottom wall 20 and sealingly secured thereto as at 30. The lower end of the leg 26 of the standpipe 22 includes a reversely bent terminal end 32 which opens upwardly at its free end and has a tubular valve body 34 secured thereon. The tubular valve body includes a valve assembly 36 threadedly engaged therein and the valve assembly 36 includes a vertically reciprocal valve stem 38. The valve stem 38 is spring-biased toward an uppermost position defining a closed position and may be urged downwardly from its uppermost position toward an open position wherein air under pressure between the lower and upper bottom walls 18 and 20 may be vented through the standpipe 22 and the valve assembly 36 into the interior of the bucket 10 above the upper bottom wall 20 thereof. Of course, the interior of the bucket 10 is adapted to be filled with water to the level 40 spaced above the valve stem 38.

A tubular support member 42 is provided and defines an internally threaded and downwardly opening cap which may be threaded onto the exteriorly threaded upper end portion 44 of the valve assembly 36. The cap 42 has a vent opening 46 formed therein and the lower end portion of a vertical operating rod 48 is sealingly secured downwardly through the upper end of the cap 42 and includes a lower terminal end 49 which projects downwardly into the interior of the cap 42 and is engageable with the valve stem 38 to urge the latter downwardly from its closed position toward its open position upon the cap 42 being threaded downwardly upon the externally threaded upper end portion of the valve assembly 36. Of course, when the cap 42 is threaded downwardly onto the valve assembly 36 so as to downwardly displace the valve stem 38, compressed air within the air chamber 50 defined between the upper and lower bottom walls 20 and 18 is vented through the standpipe 22 and the valve assembly 36 and into the interior of the cap 42 for discharging through the opening or aperture 46. Of course, the air discharged through the opening or aperture 46 may bubble upwardly through the water within the interior of the bucket 10 above the bottom wall 20 thereof for the purpose of aerating the water.

The upper end of the operating rod 48 projects upwardly through and is rotatably received in a bore 52 formed through a stationary partial top wall 54 secured over one side portion of the upper end of the bucket 10 and the upper end of the operating rod 48 has an operating knob 56 mounted thereon whereby the operating rod 48 may be readily turned from the exterior of the bucket 10 in order to control the amount of air being vented into the water within the bucket 10 through the opening 46 in the cap 42.

The bucket 10 further includes a top wall portion 58 which is hingedly supported from the stationary top wall portion or section 54 as at 60 and which may be swung from the closed position thereof illustrated in FIGS. 1 and 2 upwardly and over the stationary top wall portion 54 to an open position whereby access may be had to the interior of the bucket 10 above the bottom wall 20. The free swinging edge of the top wall portion 58 is provided with a spring clip 62 engageable with a reinforcing bead 64 extending about the upper marginal portion of the body 12 in order to releasably retain the top wall section 58 in a closed position. Also, the body 12 includes a pivotally mounted bail type handle 66 by which the bucket 10 may be conveniently carried.

A short relief tube 66 is also secured through the upper bottom wall 20 and is closed at its upper end by means of a resilient cap 68. However, if the air pressure within the chamber 50 is increased above a predetermined maximum, the cap 68 is of a type to be dislodged from the upper end of the tube 66 so as to vent the excess pressure from within the chamber 50 upwardly through the water within the upper portion of the bucket 10. Still further, the bottom wall 18 is provided with a drain opening 70 in which a threaded plug 72 is removably secured and the plug 72 may be removed in order to drain any condensation which may collect within the chamber 50.

It will also be noted from FIG. 1 of the drawings that one of the side wall portions 14 has an air check valve equipped air inlet fitting 74 secured therethrough whereby the chuck of an air pressure hose may be operatively engaged with the fitting 74 in order to introduce air under pressure into the chamber 50. Still further, an elongated air pump 76 has its tubular body portion 78 secured radially through the side wall portion 14 and includes a longitudinally reciprocal piston rod assembly 80 which may be manually reciprocated in order to pump ambient air under pressure into the chamber 50. Therefore, the minnow bucket 10 can also be utilized in a location remote from a source of air under pressure and the pump 76 may be manually operated when needed in order to charge the air chamber 50 with air under pressure. Further, after air under pressure has been introduced into the air chamber 50, the rod 40 may be rotated sufficiently to thread the cap 42 downwardly on the tubular valve assembly 36 to cause the lower end of the rod 48 to depress the valve stem 38 from a fully closed position toward an open position. In this manner, air from the interior of the pressure chamber 50 may escape, at a controlled rate, through the opening 46 in the cap 42 and bubble upwardly through the water disposed within the minnow bucket 10 above the upper bottom wall 12 thereof.

When the air pressure within the chamber 50 has been deleted to a point only slightly above atmospheric pressure, any tendency of water from within the interior of the bucket 10 to flow in a reverse direction through the standpipe 22 will be prevented by the uppermost portion 28 of the standpipe 22 being disposed above the water level 40. Thus, no water from the interior of the bucket 10 above the upper bottom wall 20 may flow backwardly through the standpipe 22 and into the air chamber 50. Also, should condensation collect within the air chamber 50, such condensation may be removed therefrom by first venting off the pressure within the chamber 50 and then removing the plug 72 in order that the condensation may drain through the opening 70.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A minnow bucket with water aerating means, said bucket including peripherally continuous upstanding side wall portions, rigid upper and lower vertically spaced closure walls extending and sealingly secured across the lower end portions of said side wall portions and defining an upwardly opening water receptacle above said upper closure wall and a closed airtight chamber between said closure walls, air passage means opening through said upper closure wall, including an inlet end open to said chamber and an upwardly opening outlet end above said upper closure wall, a tubular valve body supported within said outlet end, a valve element shiftably supported centrally within said valve body for movement between lower and upper open and closed limit positions, respectively, a support member threadedly engaged with the upper end of said body and including an abutment portion engageable with said valve element upon downward threading of said support member on said body to variably downwardly displace said element away from its closed limit position toward its open limit position for variably controlling the venting of air from said airtight chamber through said tubular valve body into said receptacle and aerating the water therein, means operative to introduce air under pressure into said chamber, a stationary partial top wall secured over one side portion of the upper end of said bucket in vertical registry with said valve body, said support member being carried by the lower end of a substantially vertical operating rod whose upper end is rotatably received through said partial top wall, and a further top wall portion hingedly supported from said partial top wall swingable into and out of position, in coaction with said partial top wall, to substantially fully close the upper end of said bucket, said upper and lower closure walls being of upright and inverted conical shape, respectively, said support member comprising a downwardly opening internally threaded cap closed at its upper end, the lower end of said operating rod being secured downwardly through the closed upper end of said cap and including a lower terminal end projecting down into the interior of said cap and comprising said abutment portion, said cap including a lateral vent opening formed in one side thereof above said tubular valve body and below the closed upper end of said cap.

2. The combination of claim 1 wherein said means operative to introduce air under pressure into said airtight chamber comprises a hand pump including a horizontal cylindrical body portion secured through one of said side wall portions intermediate said upper and lower closure walls.

3. The combination of claim 1 wherein said air passage means includes an inverted U-shaped pipe having a pair of upstanding legs interconnected at their upper ends by means of a connecting portion of said air passage means, the lower end of one of said legs being sealingly secured downwardly through said upper closure wall and comprising said inlet end and the lower end of the other of said legs terminating downwardly in an upstanding reversely bent upwardly opening terminal end comprising said outlet end, said bucket including a desired water level above said upper closure wall and below the upper ends of said side wall portions, said connecting portion and said tubular valve body being disposed above and below, respectively, said water level.

4. A minnow bucket with water aerating means, said bucket including peripherally continuous upstanding side wall portions, rigid upper and lower vertically spaced closure walls extending and sealingly secured across the lower end portions of said side wall portions and defining an upwardly opening water receptacle above said upper closure wall and a closed airtight chamber between said closure walls, air passage means opening through said upper closure wall, including an inlet end open to said chamber and an upwardly opening outlet end above said upper closure wall, a tubular valve body supported within said outlet end, a valve element shiftably supported centrally within said valve body for movement between lower and upper open and closed limit positions, respectively, a support member threadedly engaged with the upper end of said body and including an abutment portion engageable with said valve element upon downward threading of said support member on said body to variably downwardly displace said element away from its closed limit position toward its open limit position for variably controlling the venting of air from said airtight chamber through said tubular valve body into said receptacle and aerating the water therein, means operative to introduce air under pressure into said chamber, said passage means including an inverted U-shaped pipe having a pair of upstanding legs interconnected at their upper ends by means of connecting portion of said air passage means, the lower end of one of said legs being sealingly secured downwardly through said upper closure wall and comprising said inlet end and the lower end of the other of said legs terminating downwardly in a reversely bent upwardly opening terminal end comprising said outlet end, said bucket including a desired water level above said upper closure wall and below the upper ends of said side wall portions, said connecting portion and said tubular valve body being disposed above and below, respectively, said water level.

5. The combination of claim 4 wherein said means operative to introduce air under pressure into said airtight chamber comprises a check valve equipped air inlet opening through one side wall portion of said bucket into said airtight chamber.

6. The combination of claim 4 wherein said means operative to introduce air under pressure into said airtight chamber comprises a hand pump supported from one of said side wall portions and operable from the exterior of said bucket, said hand pump including a compressed air outlet opening into said airtight chamber.

* * * * *